Dec. 28, 1943.  W. ST. MAUR E. CRAKE  2,337,711
SCREW JOINT FOR SUCKER RODS AND THE LIKE
Filed Nov. 12, 1941  2 Sheets-Sheet 1
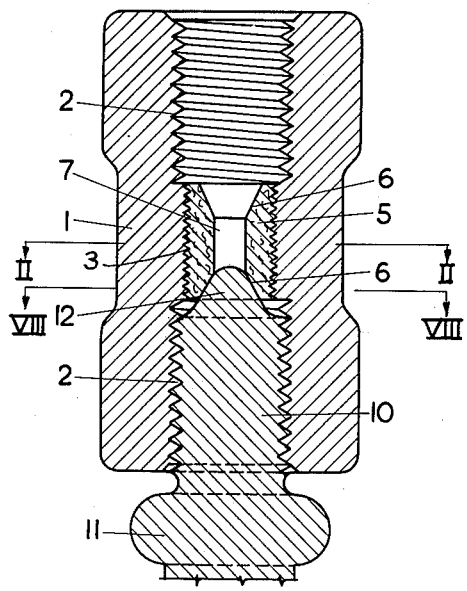
Fig. I
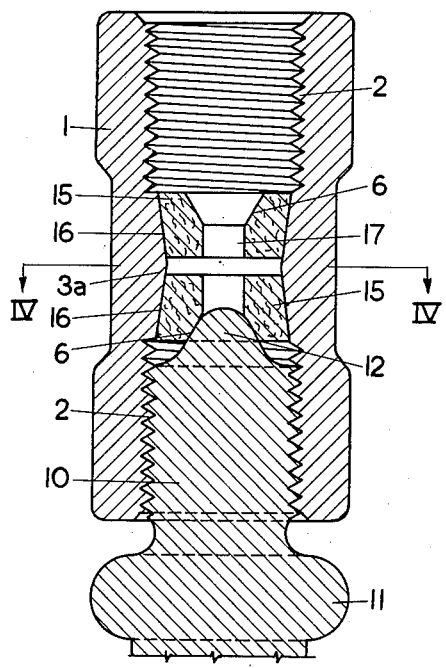
Fig. III
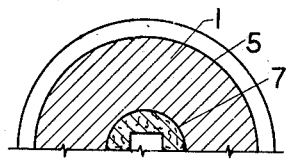
Fig. II
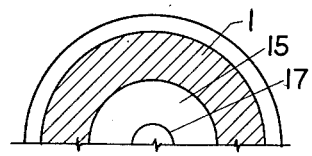
Fig. IV
Inventor: Wilfred St. Maur Elmore Crake
By His Attorney:

Dec. 28, 1943.  W. ST. MAUR E. CRAKE  2,337,711
SCREW JOINT FOR SUCKER RODS AND THE LIKE
Filed Nov. 12, 1941    2 Sheets-Sheet 2
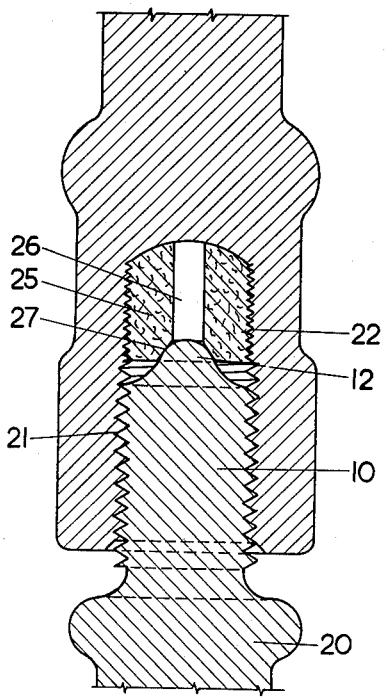
Fig. V
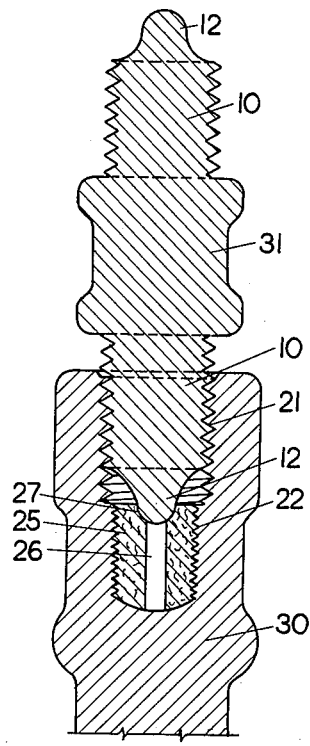
Fig. VI
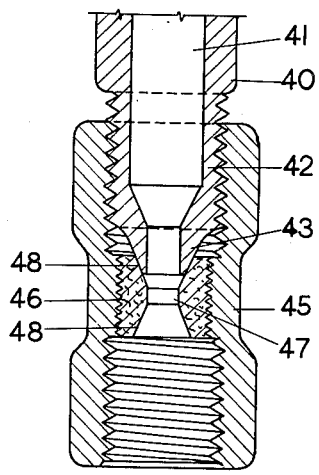
Fig. VII
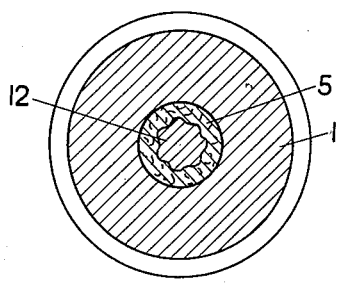
Fig. VIII
Inventor: Wilfred St. Maur Elmore Crake
By His Attorney:

Patented Dec. 28, 1943

2,337,711

UNITED STATES PATENT OFFICE 2,337,711

SCREW JOINT FOR SUCKER RODS AND THE LIKE

Wilfred St. Maur Elmore Crake, Houston, Tex., assignor to Shell Development Company, San Francisco, Calif., a corporation of Delaware Application November 12, 1941, Serial No. 418,716

8 Claims. (Cl. 287—125)

The present invention relates to improvements in screw joints and pertains more particularly to joints for sucker rods for pumping oil wells.

The general object of this invention is to provide an improved screw joint for oil well sucker rods, tubing and the like, which joint substantially reduces the possibility of failure or break at a joint in the rod or tubing string.

In the oil well industry, long strings of connected stands of sucker rod, tubing, etc., which extend down into the borehole, must be quickly disconnected into stands as the string is removed from the borehole. Likewise, when lowering the string into the borehole, the stands must be quickly connected together again. Due to the frequent and necessarily rapid disconnecting and connecting of the stands and the loads and pressures applied to the strings, the screw joints which are used to connect the stands undergo considerable stresses and strains. The screw joint couplings in sucker rod strings receive severe punishment, due to the fact that a portion of the sucker rod string, which actuates the pump at the well bottom, is subjected to a stress reversal each time the direction of the stroke of the pump changes.

Heretofore in sucker rod joints and the like the locking of the joint to prevent unscrewing due to vibration, etc., was obtained by the contact of the face around the threaded socket of a coupling against the shoulder formed behind the threaded end portion, or pin, of a rod. When properly locked or shouldered, the coupling face is forced against the rod shoulder by the action of the last or tightening turn of the threads, whereby the last turn of the threads on the rod pin (that is, the thread nearest the rod shoulder) is most heavily loaded and each successive thread turn progressing away from the rod shoulder is loaded less heavily. By overtightening, sufficient stress can be applied to the rod pin to cause a major portion of its ability to withstand loads to be used up or made unavailable for absorption of the stresses and strains imposed during use.

When the joints in the sucker rod string are heavily loaded with high strains or stresses, the action of the rod pin and coupling socket is to transfer the load from thread to thread away from the shoulder and to cause extension or expansion of the pin or socket until such action brings the threads of the pin and socket to bear against each other strongly to take up and to withstand the load. During this action, the pin shoulder may actually part from the box shoulder and tend to cause unscrewing of the joint. This may cause pin failure or separation of the rod string.

In pumping of deep wells by means of rod-operated pumps, pin troubles cause an appreciable part of the down time; that is, the time when the operation of the well is stopped for repairs. Most of these pin breaks can be traced directly to improper shouldering rather than inferior material or heat treatment in the pin, and about 25% of rod failures have been due to unscrewing. It should be remembered that in a well pumping 20 strokes per minute, there are 28,800 stress reversals per 24 hours. With this in mind, particularly in wells when gas enters the pump and the pump "pounds," it may be readily seen that even seemingly small inaccuracies in shouldering of the joint often lead to rod failures.

It is therefore an object of this invention to provide a sucker rod joint wherein the necessity for extremely accurate shouldering is eliminated.

It is a further object to provide a screw joint in which the first, instead of the last, male thread is most heavily loaded, whereby the smallest load is applied to the last thread of the rod pin, which is the weakest point, and thus rod breakage is minimized.

It is another object to provide a screw joint wherein the load is maintained most heavily on the first male thread irrespective of whether the string is under compression or extension.

It is a further object to provide an improved self-locking coupling of the screw joint type.

It is still another object to provide a screw joint wherein strength characteristics can be increased by eliminating the locking shoulders and by thus giving better forging and metal flow characteristics.

It is a further object to provide a screw joint requiring less close tolerances on threading, thereby permitting cheaper manufacture.

With these and other objects in view, the invention has particular relation to certain novel features of construction, operation, and arrangement of parts, as will be more specifically referred to and illustrated in the accompanying drawings, wherein:

Figure I is an axial sectional view of a screw joint formed by a sucker rod and a coupling, showing one embodiment of the present invention.

Figure II is a cross-sectional view taken along the line II—II of Figure I.

Figure III is similar to Figure I, showing another embodiment.

Figure IV is a cross-sectional view taken along the line IV—IV of Figure III.

Figure V is an axial sectional view of another embodiment of the present screw joint.

Figure VI is an axial sectional view of still another embodiment of the present screw joint.

Figure VII is an axial sectional view of a further embodiment of the present screw joint.

Figure VIII is a cross-sectional view taken along the line VIII—VIII of Figure I, showing a modification of the pin end.

Briefly, the apparatus of the present invention comprises externally and internally threaded members, and resilient but difficultly compressible means adapted to be compressed between the end of the externally threaded member and the internally threaded member whereby a heavier load is built up on the first thread of the externally threaded members when the two members are threadably joined together.

The invention, having particular advantages in sucker rods which are subject to the severe punishment of continual stress reversals, will be described in more detail in reference to such sucker rod joints, whereby it is to be understood that changes, modifications, and variations may be resorted to which fall within the scope of the invention as claimed.

Referring to Figures I and II of the drawings, a preferred embodiment of the present invention comprises a tubular coupling body 1 with an axial bore having internally threaded end portions or joint boxes 2, preferably with parallel threads, and a threaded intermediate portion 3 with smaller threads than those of the end portions.

Adapted to fit into said intermediate portion 3 is an externally threaded cylindrical member 5 having small threads adapted to engage the threads of said intermediate portion 3. Each end of said member 5 is provided with a coaxial tapered receiving portion 6 which converges toward the center. Extending coaxially through the member 5 from the bottom of one tapered portion 6 to the other is a square or other type angular hole 7 for receiving a wrench or similar engaging tool.

The cylindrical member 5 is formed of a resilient but only difficulty compressible material; that is a material which may be temporarily deformed only by a considerable force. Suitable materials include fiber compositions, such as hard red fiber, as illustrated in Figure I, hard rubber (synthetic and natural), asbestos fiber, mixtures thereof, as well as mixtures with fillers, and other, preferably oil-resistant, bushing materials.

Screwed into a threaded end portion 2 by means of an externally threaded end portion or pin 10, preferably with parallel thread, is a rod segment 11. The outer extremity of the rod 11 is reduced in diameter to form a converging taper or rounded end 12, which may have a conical ellipsoidal, spheroidal, or like section through the axis, whereby the taper 12 is adapted to be forced into a tapered receiving portion or flare 6 of the compressible member 5 to compress said member 5 by the resulting wedging action when the rod pin 10 is screwed into the box 2 in the coupling. The extended end 12 of the pin 10 permits an increased area of contact between the pin 10 and compressible member 5 and thereby increases the frictional resistance between these elements to prevent unscrewing of the joint when loaded. The frictional resistance may be further increased by forming the pin end with a slightly serrated cross-section as shown to an exaggerated degree in Figure VIII.

When making up; that is connecting rod sections into a sucker rod string according to the present invention a compressible member 5 is screwed into place within the intermediate portion 3 by means of a wrench engaged in a suitably shaped hole such as a coaxial square hole 7 in the member 5. The rod pin 10 is then screwed into the box 2 of the coupling and the rounded extremity 12 is forced into the tapered or beveled receiving portion 6 of the compressible member 5. Since the intermediate portion 3 and the compressible member 5 have finer threads than the pin, the rounded end 12 of the rod pin moves into the tapering receiving portion 6 of the member 5 faster than the member 5 can unscrew out of contact whereby the member 5 is compressed by the resulting wedging action. When unscrewing the pin 10, the rounded end 12 of the pin moves out of the compressible member 5 faster than the member 5 can follow, the threaded engagement of the member 5 with the coupling body preventing the member 5 from coming out with the pin end 12 from its proper position. By this arrangement of different threads, movement of the compressible member 5 out of the intermediate portion 3 of the coupling 1 is prevented.

When the rounded end 12 of the pin is screwed against the compressible member 5, a high pressure is set up between the member 5 and the pin end 12, and the member 5 will compress appreciably so that when wrenching is completed and stopped, the first thread of the pin 10 is forced against the first contacting thread of the box 2 away from the compressible member 5. The makeup, or tightening, load is thus applied against the first thread of the pin 10 most heavily, and on other threads away from the compressible member 5 in a progressively lower amount.

When a tension load is applied to the box 2 and pin 10 of a sucker rod string, the threads away from the member 5 are progressively loaded in proportion to the magnitude of the load; that is, the second thread from the end of the pin takes up some of the load, but less than is taken up by the first thread; the third thread takes up less of the load than the second; and similarly the rest of the threads take up a progressively lower proportion of the load.

There is thus no tendency for the pin end 12 to separate from the locking or friction surface of the tapered receiving portion 6 of the compressible member 5, with one exception, i. e., by the amount of extension in the coupling body 1 itself between the thread of the pin 10 nearest the member 5 and member 5. This extension will be more than taken up by the resilient compressibility of the member 5, whereby the friction or locking action is maintained irrespective of applied loads.

In Figures III and IV is shown another preferred embodiment. The compressible means corresponding to the member 5 in Figure I is divided into two compressible elements 15, and the intermediate portion 3a of the coupling body 1 is provided with a bore having tapers or bowls 16 converging toward the center. Each compressible element 15 is externally tapered in complement to the tapered bowls 16. The compressible elements 15 are provided with internally tapered portions 6, adapted to receive the rounded or tapered ends 12 of the rod pin 10. Since the elements 15 are not screwed into place, no angular holes therethrough are necessary, although coaxial bores 17 through the elements 15 may be provided, if desired.

The action of this embodiment (Figures III and IV) of the present invention is essentially the same as the previously-described embodiment (Figures I and II); that is, resilient means are compressed between the end 12 of the rod pin 10 and the coupling 1, whereby a force is maintained against the end 12 of the rod pin 10 for insuring that the first thread is most heavily loaded. Thus, the rounded end 12 of the pin 10, upon entering the tapered receiving portion 6 of a compressible element 15, forces the element 15 along the converging taper 16 until said element 15 is frictionally held under compression therebetween.

It will be readily apparent that various modifications, variations, and changes can be made within the scope of appended claims without departing from the spirit of the present invention. For example, the invention may be applied to the joining of sucker rods, wherein, as shown in Figure V, a rod segment 20 has at one end an external thread or pin 10 with a rounded end 12 and at the other end an internally threaded socket or box 21 having a deepened portion 22 of smaller diameter. The portion 22 is threaded with smaller threads than those of the box 21 and is thereby adapted to receive an externally threaded compressible member 25 having a square coaxial hole 26 and a beveled internal face 27 adapted to receive the rounded end 12 of the pin 10. Likewise, as shown in Figure VI, both ends of the sucker rod section 30 may be formed with a box 21 and smaller threaded portion 22, provided with a compressible member 25, as described in relation to Figure V, and a coupling stud member 31 having pins 10 and rounded extremities 12 at both ends thereof. Further, according to the present invention, as shown in Figure VII, tubular members such as member 40 having an axial bore 41 and an externally threaded end 42 provided with rounded or tapered ends 43 of narrowed diameter may be rigidly joined with a coupling 45 similar to coupling 1 (Figure I) but with a wider bore therethrough, which coupling 45 is provided with an externally threaded compressible member 46, having a coaxial bore 47 therethrough and internal beveled faces 48 at each end.

I claim as my invention:

1. In combination, sucker rods having externally threaded end portions and a tapering projection extending axially beyond said threaded portions, a coupling joint for said rods comprising a hollow cylindrical member having a bore with threaded end portions for engagement with said threaded rod ends of a pair of sucker rods and an intermediate threaded portion, and means for locking said rod and said joint, said means comprising a resilient and difficultly but substantially compressible member, said resilient member being externally threaded and adapted to be inserted into the intermediate threaded portion of said bore between said threaded end portions, said resilient member having an axial receiving flare adapted to register with said tapering projection of the rod when said rod and said joint are threadably coupled, whereby the compression force set up in said resilient member by the wedging action between said projection and said flare is applied to the rod threads engaging the joint threads.

2. In combination, sucker rods having externally threaded end portions and a tapering projection extending axially beyond said threaded portions, a coupling joint for said rods comprising a hollow cylindrical member having a bore with threaded end portions for engagement with said threaded rod ends of a pair of sucker rods and an intermediate threaded portion of restricted bore, and means for locking said rod and said joint, said means comprising a resilient and difficultly but substantially compressible member, said resilient member being externally threaded and adapted to be inserted into the intermediate threaded portion of said bore between said threaded end portions, said resilient member having an axial receiving flare adapted to register with said tapering projection of the rod when said rod and said joint are threadably coupled, whereby the compression force set up in said resilient member by the wedging action between said projection and said flare is applied to the rod threads engaging the joint threads.

3. In combination, sucker rods having externally threaded end portions and a tapering projection extending axially beyond said threaded portions, a coupling joint for said rods comprising a hollow cylindrical member having a bore with threaded end portions for engagement with said threaded rod ends of a pair of sucker rods and an intermediate threaded portion having smaller threads than said end portions, and means for locking said rod and said joint, said means comprising a resilient and difficultly but substantially compressible member, said resilient member being externally threaded with threads complementary to the threads of said intermediate coupling portion and thereby adapted to be inserted into the intermediate threaded portion of said bore between said threaded end portions, said resilient member having an axial receiving flare adapted to register with said tapering projection of the rod when said rod and said joint are threadably coupled, whereby the compression force set up in said resilient member by the wedging action between said projection and said flare is applied to the rod threads engaging the joint threads.

4. In combination, sucker rods having externally threaded end portions and a tapering projection extending axially beyond each of said threaded portions, a coupling joint for said rod comprising a hollow cylindrical member having a bore with threaded end portions for engagement with said threaded rod ends and an unthreaded intermediate portion between said threaded end portions, said intermediate portion being convergingly tapered away from the threaded end portions toward the middle of the coupling joint, and means for locking said rods and said joint, said means comprising resilient and difficultly but substantially compressible members adapted to be inserted into said tapered intermediate portion of said bore between said threaded end portions of the coupling joint, said resilient members being externally tapered to complement the taper of said tapered intermediate portion of said joint, each of said resilient members having an axial receiving flare adapted to register with said tapering projection of the rod when said rod and said joint are threadably coupled, whereby the compression force set up in said resilient member by the wedging action between said projection and said flare is applied to the rod threads engaging the joint threads.

5. In combination, an elongated cylindrical member having an externally threaded end portion and a tapering projection extending axially beyond said threaded portion, a second elongated cylindrical member having in one end a coaxial bore threaded internally at the mouth for engagement with said threaded end portion of said first elongated member, whereby said elongated members are adapted to be joined together coaxially, and means for locking said elongated members together, said means comprising a resilient and difficultly but substantially compressible member adapted to be inserted into said bore beyond said threaded end portion, said resilient member having an axial receiving flare adapted to register with said tapering projection when said elongated members are threadably coupled, whereby the compression force set up in said resilient member by the wedging action between said projection and said flare is applied to the threads of the elongated members.

6. In combination, a sucker rod having an externally threaded end portion and a tapering projection extending axially beyond said threaded portion, a second sucker rod having in one end a coaxial bore threaded internally at the mouth for engagement with said threaded end portion of said first sucker rod, whereby said rods are adapted to be joined together coaxially, and means for locking said rods together, said means comprising a resilient and difficultly but substantially compressible member adapted to be inserted into said bore beyond said threaded end portion, said member having an axial receiving flare adapted to register with said tapering projection when said rods are threadably coupled, whereby the compression force set up in said resilient member by the wedging action between said projection and said flare is applied to the rod threads.

7. In combination, sucker rods adapted to be joined together coaxially and having externally threaded end portions and tapering projections extending axially beyond said threaded portions, and resilient and difficultly but substantially compressible means having co-axial tapered receiving portions into which said tapered projections are forced when said sucker rods are threadably joined together, thereby compressing said compressible means against the ends of said sucker rods.

8. In a screw-threaded well joint, elongated cylindrical members to be joined together coaxially, threaded means including threaded end portions on said members for joining said members together, resilient and difficultly but substantially compressible means having a coaxial tapered receiving portion, and tapered means associating with said threaded means and adapted to be forced into said receiving portion of said compressible means, thereby compressing said compressible means against the ends of said cylindrical members, when said cylindrical members are threadably joined together, the outer end faces of said compressible means being substantially enclosed by said tapered means, said threaded means and said cylindrical members.

WILFRED ST. MAUR ELMORE CRAKE.